United States Patent
Hugg (10) Patent No.: US 9,600,514 B2
(45) Date of Patent: Mar. 21, 2017

(54) METHODS AND SYSTEMS FOR DETECTING DATA DIVERGENCE AND INCONSISTENCY ACROSS REPLICAS OF DATA WITHIN A SHARED-NOTHING DISTRIBUTED DATABASE

(71) Applicant: VoltDB, Inc., Bedford, MA (US)

(72) Inventor: John H. Hugg, Belmont, MA (US)

(73) Assignee: VOLTDB, INC., Bedford, MA (US)

( * ) Notice: Subject to any disclaimer, the term of this patent is extended or adjusted under 35 U.S.C. 154(b) by 226 days.

(21) Appl. No.: 14/480,102

(22) Filed: Sep. 8, 2014

(65) Prior Publication Data

US 2015/0074063 A1 Mar. 12, 2015

Related U.S. Application Data (60) Provisional application No. 61/875,283, filed on Sep. 9, 2013.

(51) Int. Cl.
*G06F 17/00* (2006.01)
*G06F 17/30* (2006.01)

(52) U.S. Cl.
CPC .... *G06F 17/30371* (2013.01); *G06F 17/3033* (2013.01); *G06F 17/30212* (2013.01); *G06F 17/30215* (2013.01); *G06F 17/30578* (2013.01)

(58) Field of Classification Search
CPC .............. G06F 17/30; G06F 17/30371; G06F 17/30578; G06F 17/30215; G06F 17/30174; G06F 17/30575
USPC .................................................. 707/600–899
See application file for complete search history.

(56) References Cited

U.S. PATENT DOCUMENTS

| | | |
|---|---|---|
| 5,875,334 A | 2/1999 | Chow et al. |
| 5,963,959 A | 10/1999 | Sun et al. |
| 6,081,801 A | 6/2000 | Cochrane et al. |
| 7,631,293 B2 | 12/2009 | Alcorn |
| 7,707,174 B2 | 4/2010 | Saito et al. |
| 7,752,197 B2 | 7/2010 | Dettinger et al. |
| 7,818,349 B2 | 10/2010 | Frost |
| 8,225,058 B2 | 7/2012 | Miyamoto et al. |
| 9,009,203 B2 | 4/2015 | Schreter |
| 2002/0103654 A1 | 8/2002 | Poltorak |
| 2006/0224561 A1 | 10/2006 | Bestgen et al. |
| 2006/0271557 A1 | 11/2006 | Harward et al. |
| 2012/0011106 A1 | 1/2012 | Reid et al. |
| 2013/0198139 A1 | 8/2013 | Skidanov et al. |
| 2013/0198166 A1 | 8/2013 | Prout et al. |

(Continued)

*Primary Examiner* — Isaac M Woo
(74) *Attorney, Agent, or Firm* — Goodwin Procter LLP (57) ABSTRACT

Methods and systems are disclosed for detecting data divergence or inconsistency across replicas of data maintained in replica nodes in a shared-nothing distributed computer database system. The replica nodes communicate with a coordinator node over a computer network. The method includes the steps of: (a) receiving an operation at the coordinator node; (b) transmitting the operation to the replica nodes to be executed by each replica node to generate an operation result and a hash representation of the operation or of the operation result; (c) receiving the operation result and the hash representation generated by each of the replica nodes; and (d) determining whether the operation resulted in data divergence or inconsistency by detecting when the hash representations received from the replica nodes are not all the same.

28 Claims, 4 Drawing Sheets

(56) References Cited

U.S. PATENT DOCUMENTS

| | | |
|---|---|---|
| 2013/0198231 A1 | 8/2013 | Skidanov et al. |
| 2013/0198232 A1 | 8/2013 | Shamgunov et al. |
| 2014/0156586 A1 | 6/2014 | Black et al. |
| 2014/0229442 A1* | 8/2014 | Wankawala ............ G06F 3/065 707/639 |
| 2014/0244666 A1 | 8/2014 | Elias et al. |

* cited by examiner

METHODS AND SYSTEMS FOR DETECTING DATA DIVERGENCE AND INCONSISTENCY ACROSS REPLICAS OF DATA WITHIN A SHARED-NOTHING DISTRIBUTED DATABASE

CROSS REFERENCE TO RELATED APPLICATION

This application claims priority from U.S. Provisional Patent Application No. 61/875,283 filed on Sep. 9, 2013 entitled METHODS AND SYSTEMS FOR DETECTING DATA DIVERGENCE AND INCONSISTENCY ACROSS REPLICAS OF DATA WITHIN A SHARED-NOTHING DISTRIBUTED DATABASE, which is hereby incorporated by reference.

BACKGROUND

The present application relates generally to computer database systems and, more particularly, to methods and systems for detecting data divergence and inconsistency across replicas of data within a shared-nothing distributed database.

BRIEF SUMMARY OF THE DISCLOSURE

In accordance with one or more embodiments, a method is provided for detecting data divergence or inconsistency across replicas of data maintained in replica nodes in a shared-nothing distributed computer database system. The replica nodes communicate with a coordinator node over a computer network. The method includes the steps of: (a) receiving an operation at the coordinator node; (b) transmitting the operation to the replica nodes to be executed by each replica node to generate an operation result and a hash representation of the operation or of the operation result; (c) receiving the operation result and the hash representation generated by each of the replica nodes; and (d) determining whether the operation resulted in data divergence or inconsistency by detecting when the hash representations received from the replica nodes are not all the same.

In accordance with one or more further embodiments, a coordinator node is provided in a shared-nothing distributed computer database system. The coordinator node communicates with a plurality of replica nodes over a computer network. The coordinator node includes at least one processor, memory associated with the at least one processor, and a program supported in the memory for detecting data divergence or inconsistency across replicas of data maintained in the replica nodes. The program contains a plurality of instructions which, when executed by the at least one processor, cause the at least one processor to: (a) receive an operation at the coordinator node; (b) transmit the operation to the plurality of replica nodes to be executed by each replica node to generate an operation result and a hash representation of the operation or of the operation result; (c) receive the operation result and the hash representation generated by each of the replica nodes; and (d) determine whether the operation resulted in data divergence or inconsistency by detecting when the hash representations received from the plurality of replica nodes are not all the same.

In accordance with one or more further embodiments, a computer program product is provided for detecting data divergence or inconsistency across replicas of data maintained in replica nodes in a shared-nothing distributed computer database system. The replica nodes communicate with a coordinator node over a computer network. The computer program product residing on a non-transitory computer readable medium having a plurality of instructions stored thereon which, when executed by a computer processor, cause that computer processor to: (a) receive an operation at the coordinator node; (b) transmit the operation to the plurality of replica nodes to be executed by each replica node to generate an operation result and a hash representation of the operation or of the operation result; (c) receive the operation result and the hash representation generated by each of the replica nodes; and (d) determine whether the operation resulted in data divergence or inconsistency by detecting when the hash representations received from the plurality of replica nodes are not all the same.

DETAILED DESCRIPTION

In a shared-nothing distributed database, high availability is maintained in the face of node failure by maintaining replicas of the data across different nodes of a distributed database cluster. In this manner, a replica on a failing node can be lost, but a complete set of data still exists on another replica node. Having access to a complete set of data allows the database to return consistent, correct, and complete answers.

In order to return consistent, correct, and complete answers in the event of replica node failure, all replicas must be kept identical at all times. This is required because the same transaction or operation executed on each replica at the same time must return the same results.

In the exemplary embodiments illustrated herein, the shared-nothing distributed database system processes transactions as managed by a Transaction Coordinator. It should be understood that this is by way of example only and that the embodiments are equally applicable to the processing of operations generally in a shared-nothing distributed database system as managed by an operations coordinator.

Figure 1:
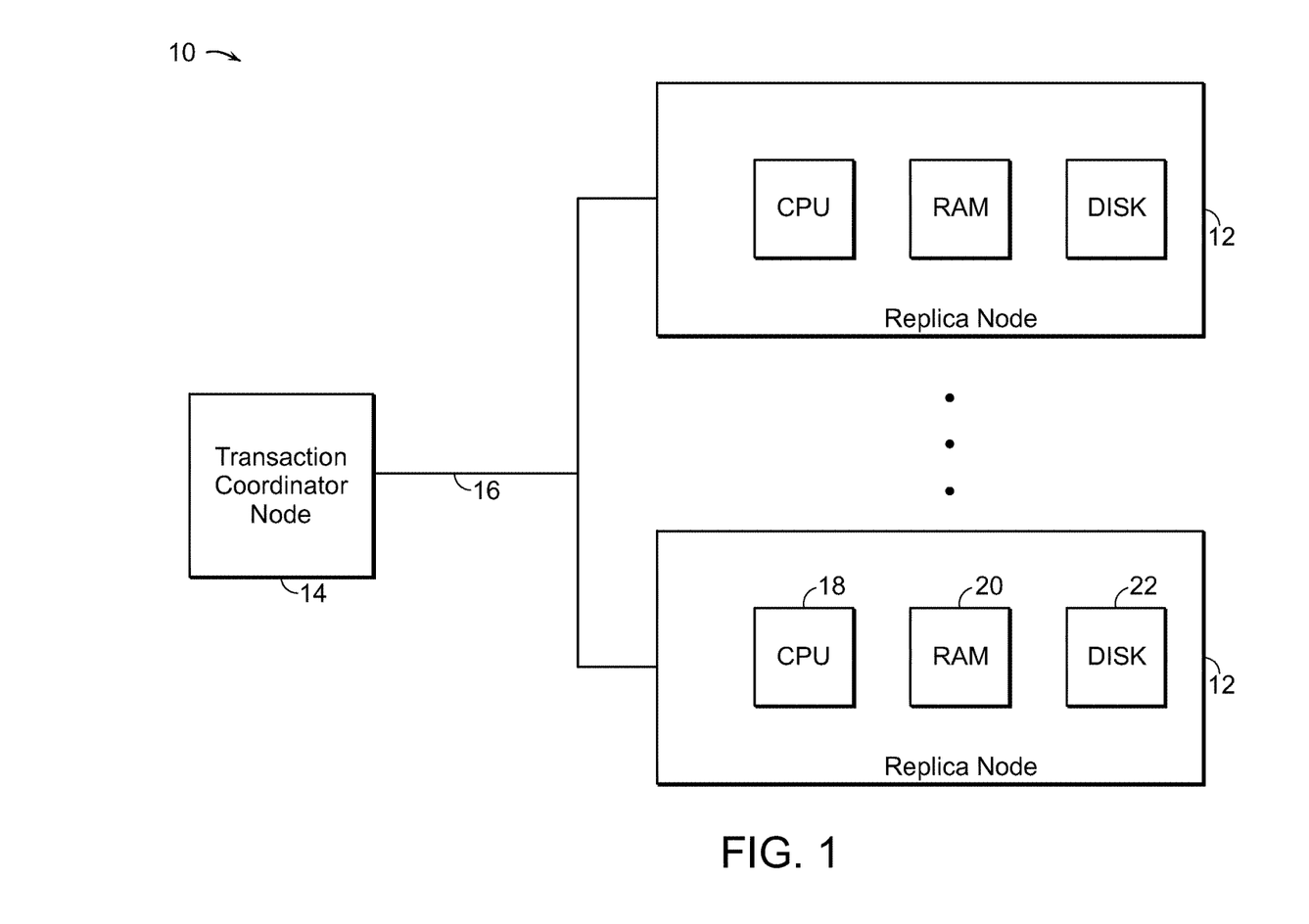
FIG. 1 is a simplified diagram illustrating an exemplary shared-nothing database system in accordance with one or more embodiments.
Figure 2:
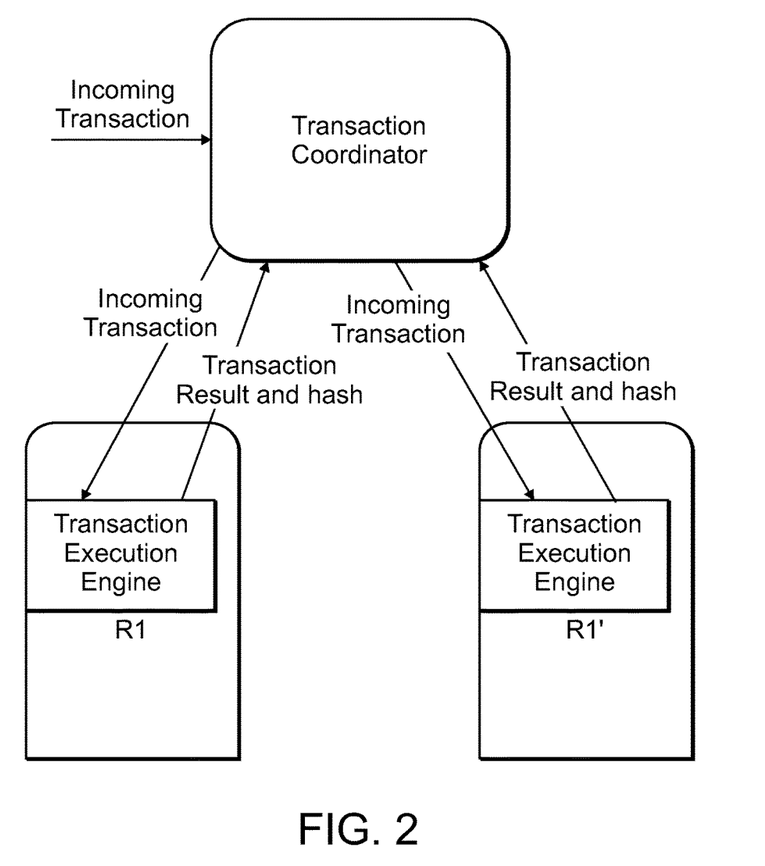
FIG. 2 is a simplified diagram illustrating operation of an exemplary Transaction Coordinator in accordance with one or more embodiments.

FIG. 1 schematically illustrates one example of a shared-nothing database system 10 in accordance with one or more embodiments. The shared-nothing database system maintains replicas of data across a plurality of replica nodes 12 of a distributed database cluster. The replica nodes are connected to a Transaction Coordinator node 14 through a computer network 16. The nodes are physically separated or isolated from one another. In one or more embodiments, each node comprises a computer system having its own processing, memory, and disk resources. Specifically, each node includes a central processing unit (CPU) 18, random access memory (RAM) 20, and disk memory 22. The techniques described herein may be implemented in one or more computer programs executing on the CPU associated with each node. Each replica node for instance includes a Transaction Execution Engine executing on its CPU as described below.

The system's synchronous intra-cluster replication requires that performing the same operations in the same order on the same state in different replicas will result in identical replicas at all times. In other words, the data must be consistent and identical in every replica instance.

The system executes transactions serially in each replica. There can be two or more replica copies of the data within the database, each containing identical transactional data. The system makes sure that each replica executes transactions in the same order. The system is configured such that that if the same operations are performed in the same order to the same original data (state), the resulting data (state) will be the same. For synchronous intra-cluster replication, the Transaction Coordinator makes sure that each transaction is executed successfully at each replica before the operation is committed and success is returned to the caller. Likewise, if a transaction fails at one replica, the Transaction Coordinator assumes it will fail at all replicas.

Since there is no inter-replica communication during an operation, the transaction operations themselves must be deterministic. If they are not, divergence can occur. For example, if one replica transaction operation inserts a randomly generated number and the same transaction operation in a different replica generates and inserts a different random number, then the replicas will have diverged. Future operations on the replicas can and will return different results.

Consider a transaction that operates on a bank account. The balance and transaction timestamp (timestamp is passed to the transaction as a parameter) must be the same across all copies of this data. Table 1 below illustrates a simple example of a transaction containing multiple operations that runs identically across all replicas of the data:

TABLE 1

Deterministic Transaction across all Replicas

| OPERATION | RESULT |
| --- | --- |
| Set balance = $100 | Balance = $100 |
| Deduct $20 from balance | Balance = $80 |
| Set transaction time to Param1 | Transaction time = Param1value |
| Return Balance | Balance = $80 |

Consider the transaction in Table 2 below, which executes similar operations on a bank account but rather than passing in a transaction timestamp, it computes the timestamp. In this transaction the timestamp will very likely be different in each replica due to the fact that it is nearly impossible that the time would be computed exactly the same on different machines (or even different process spaces on the same machine):

TABLE 2

Non-Deterministic Transaction between all Replicas

| OPERATION | RESULT |
| --- | --- |
| Set balance = $100 | Balance = $100 |
| Deduct $20 from balance | Balance = $80 |
| Set date of operation to local computation of NOW( ) | Date computed in local machine (can be different on each machine!) |
| Return Balance | Balance = $80 |

Differing data across replicas results in inconsistent data—leaving open to question which data to trust. For example, perhaps a customer gets one free bank withdrawal per day, and since the timestamp is different, a withdrawal around midnight might count towards different days at different replicas. For this reason, it is critically important that copies of data be kept completely consistent and match all other copies. Yet there is the possibility that user-created transactions could introduce differences. In addition to the timestamp computation identified in Table 2, additional opportunities present themselves in the form of pseudo-random number generation.

The database system in accordance with one or more embodiments ensures that replicas do not diverge and does so with minimal communication overhead in order to maintain target throughput rates. To do this, the system maintains a running hash of the logical work done in each transaction at each replica. When the transaction logic is about to execute a sub-operation that may modify state, such as an SQL-DML (structured query language-data manipulation language) operation, a representation of the operation (this could be, but is not limited to, the SQL text defining the operation) and any applicable parameters or modifiers are added to the running hash. The cumulative running hash is returned to the Transaction Coordinator with the results of the full operation (transaction) at each replica. The logical unit that coordinates replication (the Transaction Coordinator) compares the hashes and can immediately detect if any sub-operation was different at different replicas, meaning the state may have diverged. At this point, appropriate action may be taken, such as repairing the state, rejecting all-but-one replica, or shutting down the database.

Note that this requires that sub-operations with identical representations be deterministic. The system has carefully ensured its operations, which could be SQL-DML, are always deterministic, given the same operations (SQL commands) and parameter values.

The benefits of this processing may include the following:
1. Data divergence is computed against distributed state.
2. Does not require n^2 (n squared) communication between replicas.
3. Does not require blocking communication between replicas.
4. This method identifies the transaction, as well as the operation within the transaction, that introduced replica divergence.
5. The operation is computationally fast and space efficient.

Figure 3:
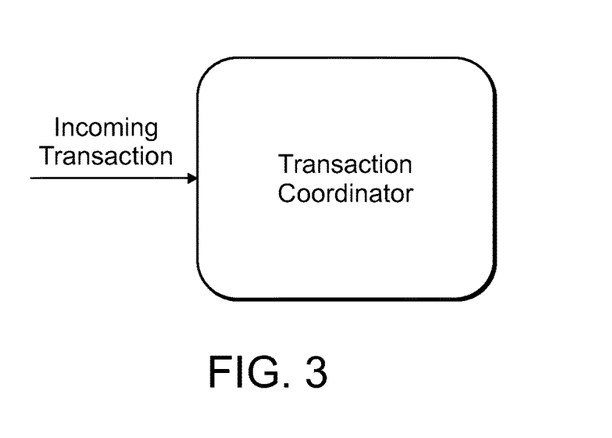
FIG. 3 is a simplified diagram illustrating an exemplary Transaction Coordinator receiving an incoming transaction in accordance with one or more embodiments.

The steps in a process in accordance with one or more embodiments are as follows:
1. The Transaction Coordinator receives a transaction as shown in FIG. 3. By way of simple example, the incoming transaction could contain the operation in Table 3.

TABLE 3

| Exemplary Transaction |
|---|
| TRANSACTION |
| Set balance = $100 |
| Deduct $20 from balance |
| Set date of operation to local computation of NOW( ) |
| Return Balance |

Figure 4:
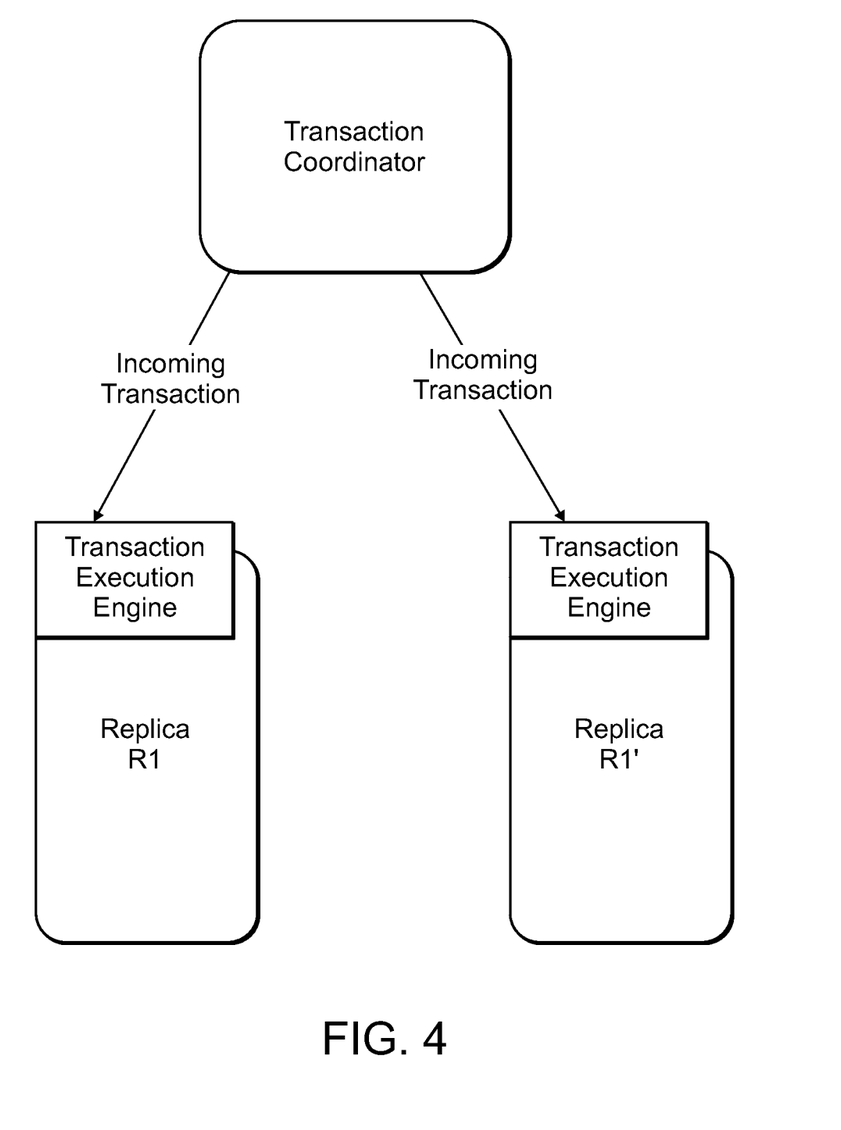
FIG. 4 is a simplified diagram illustrating delivery of incoming transactions to replica nodes in accordance with one or more embodiments.
Figure 5:
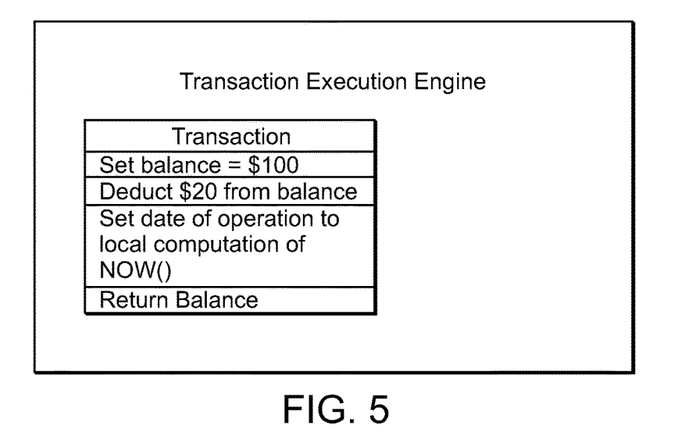
FIG. 5 is a simplified diagram illustrating execution of an exemplary transaction by the Transaction Execution Engine of a replica node in accordance with one or more embodiments.

2. The Transaction Coordinator delivers the transaction to the Transaction Execution Engine of every participating replica and replica copy as shown in FIG. 4. Note that each replica copy contains the exact same data as its corresponding replica(s).
3. Each participating replica's Transaction Execution Engine executes the transaction as shown in FIG. 5. The transaction may comprise one or more operations to execute. The transaction may also have parameters that are fed to the operations.
4. The Transaction Execution Engine maintains a set of Hash values. When the transaction logic is about to execute a sub-operation that may modify state, such as SQL-DML, a hash representation of the operation (this could be, but is not limited to, the SQL text defining the operations) and any applicable parameters or modifiers are added to the running hash set or value as shown in the example of Table 4.

TABLE 4

Transaction Operation Hashes Computed

| OPERATION | OPERATION RESULT | RESULT HASH |
|---|---|---|
| Set balance = $100 | Balance = $100 | <Computed hash #1> |
| Deduct $20 from balance | Balance = $80 | <Computed hash #2> |
| Set date of operation to local computation of NOW( ) | Date computed in local machine (can be different on each machine!) | <Computed hash #3> |
| Return Balance | Balance = $80 | <Cumulative hash> |

Figure 6:
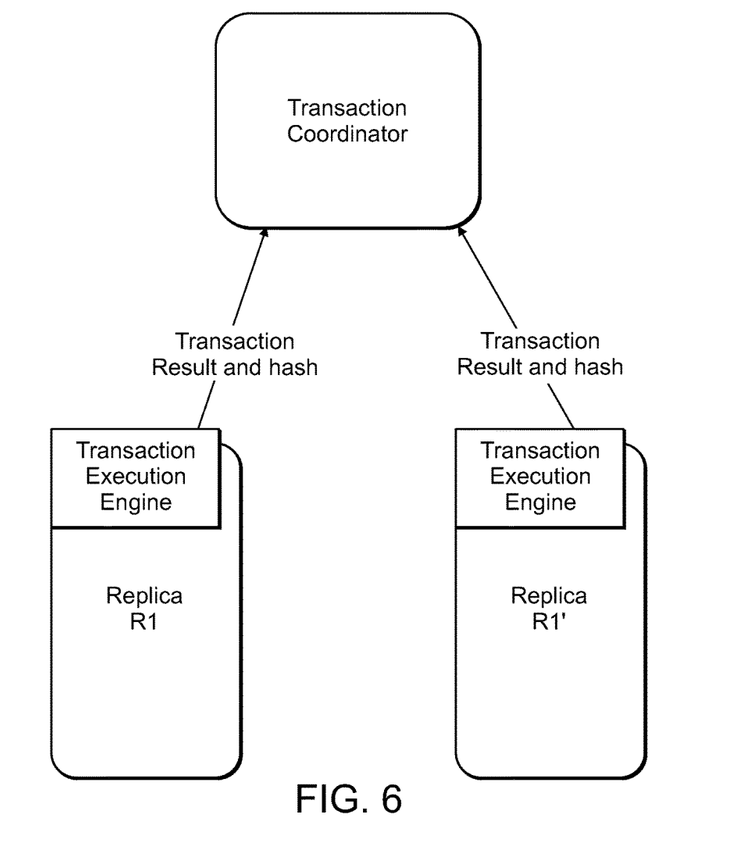
FIG. 6 is a simplified diagram illustrating transmission of exemplary transaction results to the Transaction Coordinator in accordance with one or more embodiments.

5. The transaction result, as well as the resulting hash value and set from each replica is returned to the coordinating Transaction Coordinator as shown in FIG. 6 and in Table 5 below.

TABLE 5

Transaction Result to Return

| TRANSACTION RESULT | TRANSACTION HASH RESULT |
|---|---|
| Balance = $80 | <Computed hash #1> |
|  | <Computed hash #2> |
|  | <Computed hash #3> |
|  | <Cumulative hash> |

6. The coordinating Transaction Coordinator compares the cumulative hashes from each participating replica. If the all the hash values are equal, the transaction ran identically and resulted in identical data and answers in each replica. If there is a difference in the hashes, then replicas have diverged; they are no longer exact copies of each other. An inconsistent system now exists and must be rectified. At this point, appropriate action may be taken such as, e.g., repairing the state, rejecting all-but-one replica, or shutting down the database.

TABLE 6

Replica R1 Result

| TRANSACTION RESULT | TRANSACTION HASH RESULT |
|---|---|
| Balance = $80 | <Computed hash #1> = 123 |
|  | <Computed hash #2> = 456 |
|  | <Computed hash #3> = 789 |
|  | <Cumulative hash> = 1368 |

TABLE 7

Replica R1' Result

| TRANSACTION RESULT | TRANSACTION HASH RESULT |
|---|---|
| Balance = $80 | <Computed hash #1> = 123 |
|  | <Computed hash #2> = 456 |
|  | <Computed hash #3> = 913 |
|  | <Cumulative hash> = 1492 |

The Transaction Coordinator compares the cumulative hashes between all participating replica results. In the example illustrated in Tables 6 and 7, the hash sum of 1368 returned by Replica R1 does not equal 1492, which was the result of the transaction returned by Replica R1'. This indicates that the transaction caused diverging replica data.

In accordance with one or more embodiments, the method could be further extended to track the exact operation that introduced this divergence (operation #3 in this example) by maintaining a list of hashes matched to each operation of the transaction. Comparing lists from multiple partitions can quickly identify the operation that introduced an inconsistency, the non-deterministic result.

In accordance with one or more embodiments, a variation to the method for detecting divergence may be used in place of or in addition to the methods described above. Rather than building a hash of representations of a sequence of operations, a running hash is created by hashing individual modified data. For some operations like inserting data into a database and replacing a single value, the logical operation and the changed data are identical. However, for more complex operations, such as those possible with SQL and other query languages, the logical operation and the modified data are different. For example, the logical operation "Make the data stored at X equal to X squared" is different from "value 5 changed to 25." As another example, "give everyone in Dept. B a 5% raise" is different from the resulting list of old and new salaries. This second example illustrates the key difference between hashing the logical operation and hashing the mutated data. Sometimes the logical operation is larger, and sometimes the mutated data is larger. The methods are essentially isomorphic in utility, though which method is more efficient usually depends on the workload.

The processes of the shared-nothing database system described above may be implemented in software, hardware, firmware, or any combination thereof. The processes are preferably implemented in one or more computer programs executing on the nodes, which each include at least one processor, a storage medium readable by the processor (including, e.g., volatile and non-volatile memory and/or storage elements), and input and output devices. Each computer program can be a set of instructions (program code) in a code module resident in the random access memory of the node. Until required by the node, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

The invention claimed is:

1. In a shared-nothing distributed computer database system including a coordinator node and a plurality of replica nodes communicating with the coordinator node over a computer network, a method of detecting data divergence or inconsistency across replicas of data maintained in the replica nodes, the method comprising the steps of:
   (a) receiving an operation at the coordinator node, wherein the operation comprises a logical database operation for performing on a replica node;
   (b) transmitting the operation to the plurality of replica nodes to be executed by each replica node to generate an operation result and a hash representation of the operation;
   (c) receiving the operation result and the hash representation generated by each of the replica nodes; and
   (d) determining whether the operation resulted in data divergence or inconsistency by detecting when the hash representations received from the plurality of replica nodes are not all the same.

2. The method of claim 1, wherein each hash representation comprises a cumulative running hash of a plurality of operations that can result in a change in state.

3. The method of claim 2, wherein each of the operations is deterministic.

4. The method of claim 2, wherein the operations comprise SQL-DML (structured query language-data manipulation language) operations.

5. The method of claim 2, further comprising maintaining a list of all hash values received from each replica node for all operations, and comparing the lists to identify an operation causing data divergence or inconsistency.

6. The method of claim 1, further comprising taking a given action upon determining that the operation resulted in data divergence or inconsistency.

7. The method of claim 6, wherein the given action comprises repairing the state, rejecting all-but-one operation at a replica node, or shutting down the database.

8. The method of claim 1, wherein the operation comprises one of a plurality of operations in a transaction.

9. The method of claim 1, wherein said nodes are physically separated.

10. The method of claim 9, wherein each of said coordinator node and the plurality of replica nodes comprise a computer system having processing, memory, and disk resources.

11. A coordinator node communicating with a plurality of replica nodes over a computer network in a shared-nothing distributed computer database system, the coordinator node comprising:
   at least one processor;
   memory associated with the at least one processor; and
   a program supported in the memory for detecting data divergence or inconsistency across replicas of data maintained in the replica nodes, the program containing a plurality of instructions which, when executed by the at least one processor, cause the at least one processor to:
      (a) receive an operation at the coordinator node, wherein the operation comprises a logical database operation for performing on a replica node;
      (b) transmit the operation to the plurality of replica nodes to be executed by each replica node to generate an operation result and a hash representation of the operation;
      (c) receive the operation result and the hash representation generated by each of the replica nodes; and
      (d) determine whether the operation resulted in data divergence or inconsistency by detecting when the hash representations received from the plurality of replica nodes are not all the same.

12. The coordinator node of claim 11, wherein each hash representation comprises a cumulative running hash of a plurality of operations that can result in a change in state.

13. The coordinator node of claim 12, wherein each of the operations is deterministic.

14. The coordinator node of claim 12, wherein the operations comprise SQL-DML (structured query language-data manipulation language) operations.

15. The coordinator node of claim 12, wherein the program further contains instructions which, when executed by the at least one processor, cause the at least one processor to maintain a list of all hash values received from each replica node for all operations, and compare the lists to identify an operation causing data divergence or inconsistency.

16. The coordinator node of claim 11, wherein the program further contains instructions which, when executed by the at least one processor, cause the at least one processor to take a given action upon determining that the operation resulted in data divergence or inconsistency.

17. The coordinator node of claim 16, wherein the given action comprises repairing the state, rejecting all-but-one operation at a replica node, or shutting down the database.

18. The coordinator node of claim 11, wherein the operation comprises one of a plurality of operations in a transaction.

19. The coordinator node of claim 11, wherein said nodes are physically separated.

20. A computer program product for detecting data divergence or inconsistency across replicas of data maintained in replica nodes in a shared-nothing distributed computer database system, said replica nodes communicating with coordinator node over a computer network, the computer program product residing on a non-transitory computer readable medium having a plurality of instructions stored thereon which, when executed by a computer processor, cause that computer processor to:
   (a) receive an operation at the coordinator node, wherein the operation comprises a logical database operation for performing on a replica node;
   (b) transmit the operation to the plurality of replica nodes to be executed by each replica node to generate an operation result and a hash representation of the operation;
   (c) receive the operation result and the hash representation generated by each of the replica nodes; and
   (d) determine whether the operation resulted in data divergence or inconsistency by detecting when the hash representations received from the plurality of replica nodes are not all the same.

21. The computer program product of claim 20, wherein each hash representation comprises a cumulative running hash of a plurality of operations that can result in a change in state.

22. The computer program product of claim 21, wherein each of the operations is deterministic.

23. The computer program product of claim 21, wherein the operations comprise SQL-DML (structured query language-data manipulation language) operations.

24. The computer program product of claim 21, wherein the program further contains instructions which, when executed by the at least one processor, cause the at least one processor to maintain a list of all hash values received from each replica node for all operations, and compare the lists to identify an operation causing data divergence or inconsistency.

25. The computer program product of claim 20, wherein the program further contains instructions which, when executed by the at least one processor, cause the at least one processor to take a given action upon determining that the operation resulted in data divergence or inconsistency.

26. The computer program product of claim 25, wherein the given action comprises repairing the state, rejecting all-but-one operation at a replica node, or shutting down the database.

27. The computer program product of claim 20, wherein the operation comprises one of a plurality of operations in a transaction.

28. The computer program product of claim 20, wherein said nodes are physically separated.

* * * * *